United States Patent [19]

Lavins et al.

[11] Patent Number: 4,580,717
[45] Date of Patent: Apr. 8, 1986

[54] METHOD AND APPARATUS FOR ATTACHING FORGING HANDLES ON BILLETS

[75] Inventors: Paul N. Lavins, Grosse Pt. Farms; Thomas R. Bogan, Sterling Heights, both of Mich.

[73] Assignee: American Induction Heating, Detroit, Mich.

[21] Appl. No.: 581,736

[22] Filed: Feb. 21, 1984

[51] Int. Cl.⁴ .................. B23K 37/04; B23K 31/02; B23K 9/20; B23K 9/225
[52] U.S. Cl. .................. 228/232; 228/44.3; 228/45; 219/98; 219/99
[58] Field of Search .......... 228/45, 6.1, 44.3, 232; 219/98, 99; 29/559; 414/186

[56] References Cited

U.S. PATENT DOCUMENTS

| | | | |
|---|---|---|---|
| 3,073,947 | 1/1963 | Mortensen et al. | 219/98 |
| 3,096,429 | 3/1961 | Mowry et al. | 219/98 |
| 3,618,845 | 11/1971 | Totten | 228/49.3 |
| 3,785,030 | 1/1974 | Une et al. | 29/281.6 |
| 3,835,285 | 9/1974 | Hinden et al. | 219/98 |
| 3,838,487 | 10/1974 | Maeda | 269/26 |
| 3,897,898 | 8/1975 | Hirose et al. | 228/49.3 |
| 3,913,819 | 10/1975 | Hirose et al. | 228/49.3 |
| 4,117,297 | 9/1978 | Scholle | 219/98 |
| 4,239,145 | 12/1980 | Martin et al. | 228/6.1 |
| 4,352,003 | 9/1982 | Arnoldt | 219/103 |

FOREIGN PATENT DOCUMENTS

| | | | |
|---|---|---|---|
| 37918 | 10/1981 | European Pat. Off. | 219/98 |
| 54278 | 4/1980 | Japan | 219/98 |
| 1461432 | 1/1977 | United Kingdom | 228/45 |

Primary Examiner—Nicholas P. Godici
Assistant Examiner—Samuel M. Heinrich
Attorney, Agent, or Firm—Krass & Young

[57] ABSTRACT

A method and apparatus is provided for attaching forging handles in the nature of studs to metal billets. The billets are passed in end-to-end relationship through a furnace following which the heated billets are individually delivered to a welding station where a welder welds a stud to the billet. The welder includes a welding head which is shifted by a translation mechanism from a feeding position where studs are successively fed to the welder to a welding position in which the stud is brought into engagement with the billet and electrical current is delivered through the stud to produce the weld.

6 Claims, 5 Drawing Figures

METHOD AND APPARATUS FOR ATTACHING FORGING HANDLES ON BILLETS

DESCRIPTION

1. Technical Field

The present invention broadly relates to attaching handles to metal billets which are used to manipulate the billet during forging operations, and deals more particularly with a process in which stud-type handles are welded to the billets.

2. Background Art

In hot forging operations where billets are formed into finished parts, it is normally necessary to attach some form of a handle or tong to the billet which may be gripped manually or with machinery to allow manipulation of the billet in a forging press or the like. In some cases, the handle is an integral part of the billet, however this approach is somewhat undesirable since the handle is formed of relatively expensive material but is discarded after the billet has been formed into the finished part.

A more commonly employed prior art technique of providing a billet handle involves hand welding a metal stud onto the billet before the billet is heated to forging temperature. This approach also has a number of shortcomings however. For example, substantial time and labor is required to hand weld the studs to the billets, and substantial variation in the position and attitude of the stud relative to the billet may result. Following hand welding, the billets are placed on a conveyor in end-to-end relationship and are transported through an induction furnace which heats the billets to approximately 2200°–2300° F. in preparation for forging operations. The billets are heated by means of electrical current delivered through a coil which surrounds the billets as they pass through the furnace. Due to the fact that the studs extend between adjacent billets, there is some degree of spacing between the billets. This spacing results in a phenomena known as "coil overlap" causing the ends of the billets to overheat. Although it is possible to minimize the overheating of the billet ends by careful system design, such a solution still does not produce desired temperature uniformity. In addition, energy consumption usually increases over conventional induction heating when the billets with tongs are heated.

It would therefore be desirable to provide a process for attaching relatively inexpensive tongs or handles to billets in a manner which eliminates overheating of the billets when they are transported through a furnace.

Prior art apparatus employed to hand weld the studs to the billets included a disposable ceramic ferrule which was placed around the stud during the welding process to prevent splattering of the welding material into the surrounding environment. These ferrules normally became fused into the weld and had to be broken away to insure that the ferrule counld not be introduced into the forging die area. The cost of the disposable ferrules and the labor involved in removing the ferrule from the stud added to the costs of the prior process.

BRIEF SUMMARY OF THE INVENTION

According to the present invention, a process and apparatus is provided for attaching stud-like handles on billets to provide a means for gripping and manipulating the billet during forging operations. The process consists of transporting the billets in end-to-end abutting relationship through an induction furnace in order to heat the billets to forging temperature. The billets are then individually delivered to a welding station where they are clamped in place. The studs are automatically fed to a welding head which is shifted from standby position to a welding position in which the stud is brought into contact with the clamped billet. After the stud is brought into contact with the billet, electrical current is passed through the stud and billet creating a weld. A reusable ferrule is permanently attached to the welder and prevents splattering of the welding material to the surrounding environment. The studs may be of various cross-sectional shapes and may include a reduced cross-sectional area where the weld takes place in order to reduce the amount of electrical current required to produce the weld.

BRIEF DESCRIPTION OF THE DRAWINGS

In the drawings, which form an integral part of the specification and are to be read in conjunction therewith, and in which like reference numerals are employed to designate identical components in the various views.

DETAILED DESCRIPTION OF THE SPECIFIC EMBODIMENTS

Figure 1:
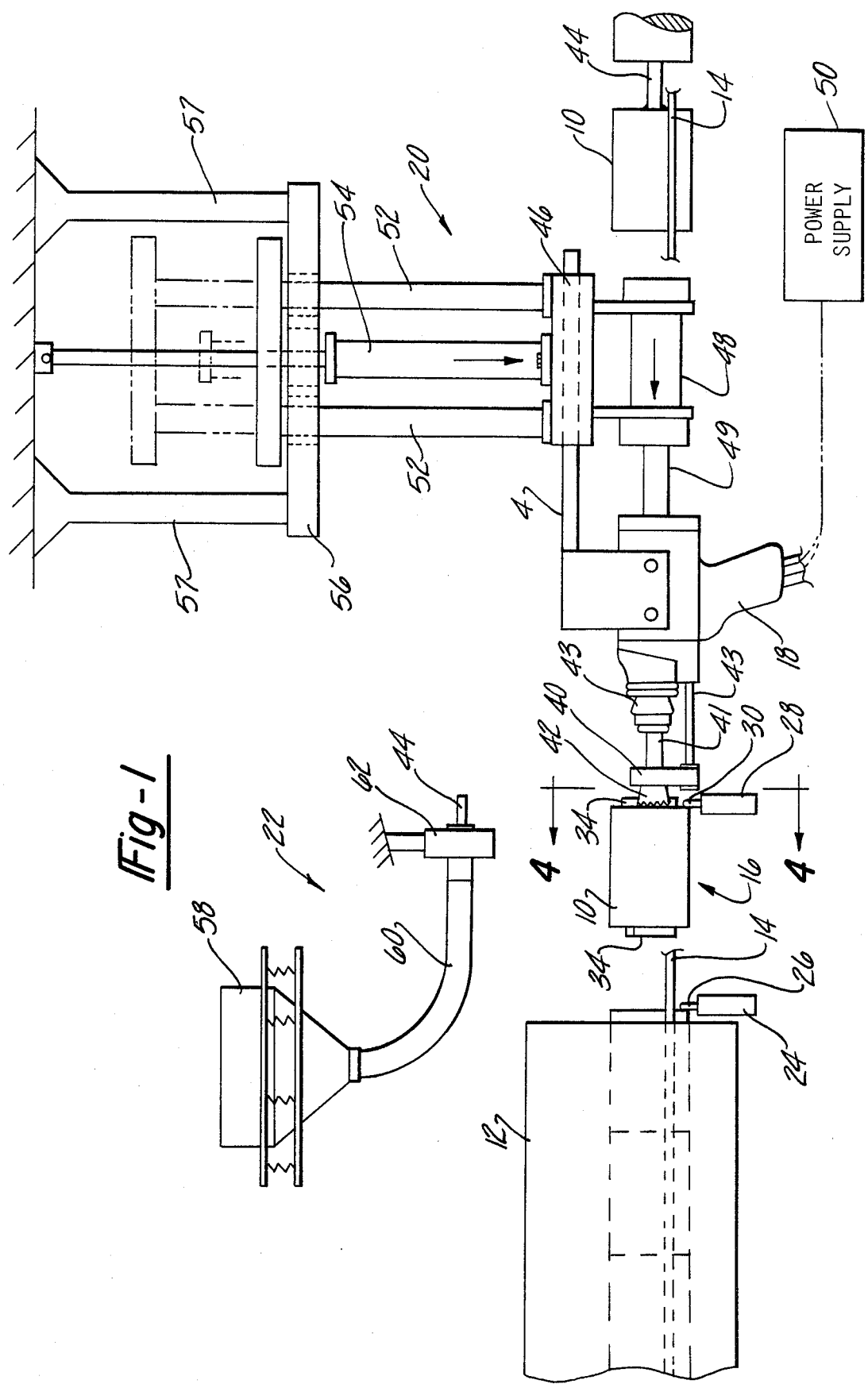
FIG. 1 is a side elevational view of the apparatus for attaching stud-like handles to heated billets, the welding head being shown in the welding position.
Figure 2:
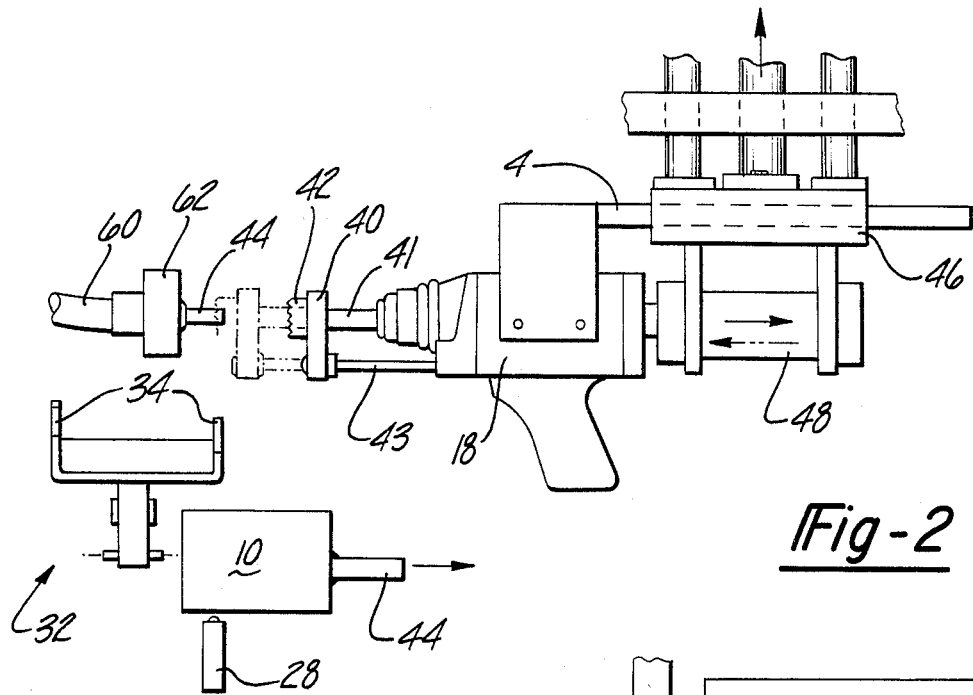
FIG. 2 is a fragmentary view of the welding head shown in a feed position with the billet having a stud welded thereto being released for transport away from the welding station.
Figure 3:
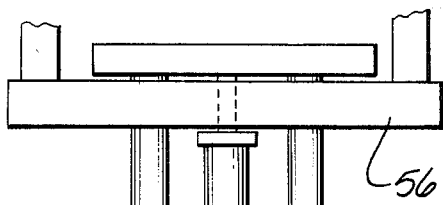
FIG. 3 is a view of the welding head in a lowered position prior to movement of the welding head into engagement with the billets.
Figure 3:
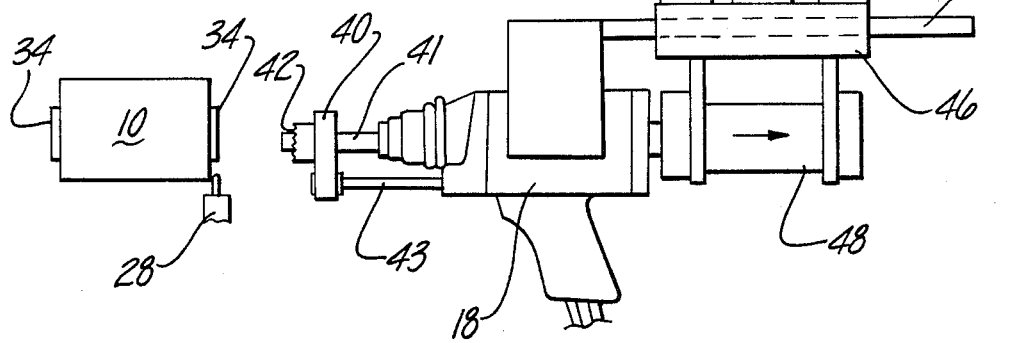

Referring to the drawings, the present invention is broadly concerned with a process and apparatus for attaching handles in the nature of a cylindrically shaped stud 44 to the end of a billet 10 of metal. A plurality of the billets 10, herein disclosed as cylindrical or square in shape, are slideably supported by a pair of spaced apart rails 14 for movement along an essentially straight path from a furnace 12 through a welding station 16. The billets 10 are arranged in essentially abutting, end-to-end relationship as they pass through the furnace 12. Furnace 12 may be of the conventional induction type in which electrical power in the form of high frequency alternating current is supplied to a coil surrounding the billets. Heat is produced in the billets by means of eddy currents induced by the high frequency field surrounding the coils. By virtue of the end-to-end abutment of the billets 10 within the furnace 12, each of the billets 10 is heated evenly and uniformly throughout its entire length and cross-section.

The billets 10 are conveyed through the furnace 12 to a solenoid operated stop 24 including a reciprocal stop element 26 which engages a portion of the end most billet 10. The end billet 10 is held within the furnace 12 until a welding operation is completed at the welding station 16 following which the stop 24 is actuated to release the next billet for travel to the welding station 16.

The welding station 16 includes a conventional arc welder 18 provided with an electrical power supply 50. Welder 18 includes a welding head 43 provided with a cylindrical collet 41 in which one end of the stud 44 is received. The outer end of collet 41 is supported in an appertured bracket 40 which is slidably supported on the welder 18 by guide rods 43. The spacing between bracket 40 and welding head 43 may be adjusted by sliding rods 43 relative to the welder 18. The welder 18 delivers electrical current through the stud 44 into the billet 10, the stud 44 and billet 10 acting as electrodes. The flow of current produces an electrical arc between the stud 44 and billet 10 which creates a pool of molten metal that quickly solidifies to produce weld between one end of the stud 44 and billet 10.

A ring-shaped ferrule 42, formed of ceramic or the like, is secured to the outer face of bracket 40, surrounding the aperture through which the collet 41 extends, and is adapted to engage the end of the billet 10 to which the stud 44 is being welded. Ferrule 42 surrounds the interface between the end of the stud 44 and the billet 10 and functions to prevent splattering of the weldment to the surrounding environment during the welding process.

Figure 4:
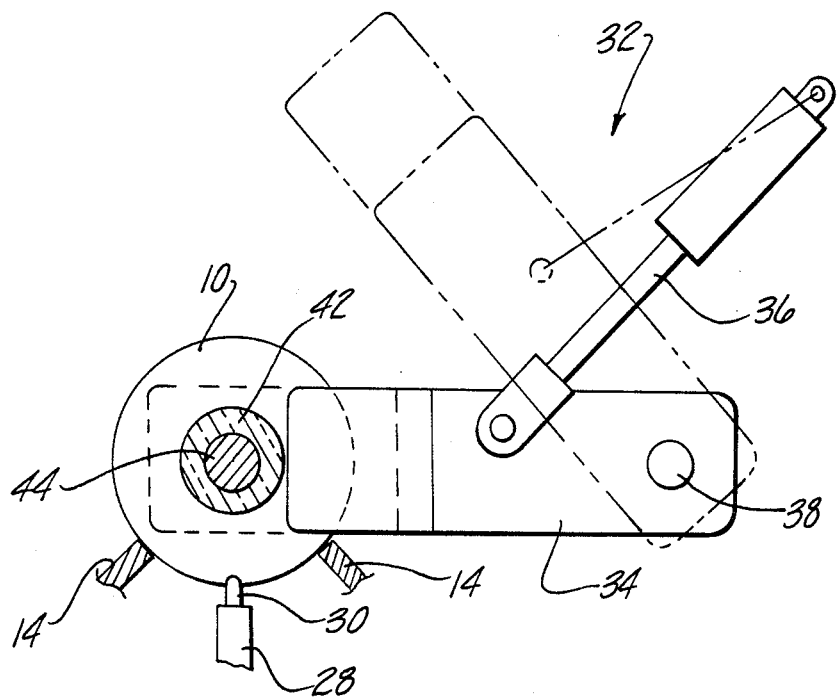
FIG. 4 is a sectional view taken along the line 4—4 in FIG. 1.
Figure 5:
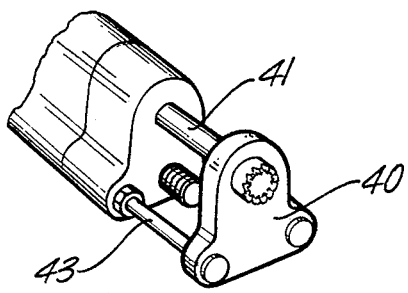
FIG. 5 is a fragmentary, perspective view of the welding head.

The billet 10 is stationarily held at the welding station 16 during the welding process by means of a holding mechanism, generally indicated by the numeral 32 in FIG. 4. The holding mechanism 32 comprises a pair of parallel, interconnected arms 34 which are pivotally mounted on any suitable support by means of a shaft 38 that extends substantially parallel to the path of travel of the billets 10. A fluid operated piston assembly 36 pivots holding arms 34 from a holding position in which the outer ends of the arms 34 overlap the ends of the billet 10, to a raised, standby position in which the billet 10 is released to travel down the rails 14. The holding mechanism 32 is electrically grounded by any suitable means and therefore forms a connection through which electrical current may flow from the billet 10 to ground during the welding process.

The welder 18 is mounted for multi-axis translational movement by a shifting or translation mechanism generally indicated by the numeral 20 in FIG. 1. The mechanism 20 includes a support bracket 46 on which the welder 18 is mounted for reciprocal movement along the path traveled by billets 10. A fluid operated piston and cylinder assembly 48 mounted beneath bracket 46 includes an output shaft 49 coupled with welder 18 in order to shift the welder 18 horizontally into and out of engagement with the billet 10 at the welding station 16. A guide rod 47 connected to the welder 18 is slidably received in bracket 46 and guides the horizontal movement of the welder 18.

The shifting mechanism 20 further includes an assembly for effecting vertical movement of the welder 18, which comprises a pair of guide rods 52 secured to bracket 46 and slidably received in a plate 56 which is mounted on any suitable support by means of struts 57. A fluid operated piston and cylinder assembly 54 is connected between the support surface and bracket 46 in order to provide power operation of the vertical translation of the welder 18. It is thus apparent that the welder 18 may be drawn away from the welding station 16 to a standby station by retracting welder 18 away from the billet 10 using cylinder 48 and then elevating the welder 18 by means of cylinder 54.

Means are provided at a stud feeding station, generally indicated by the numeral 22 for automatically feeding the studs 44 to the welder 18. A plurality of the studs 44 carried in a hopper 58 are delivered through a tube 60 to a feeding head 62 which is positioned a suitable distance above the path of the billets 10. The feeding head 62 is aligned with the path of horizontal movement of the welder 18 when the latter is suitably elevated by the cylinder 54.

In operation, the welder 18 is normally disposed at an elevation above the path of the billet 10. Solenoid 24 is actuated allowing the end of the billet 10 to be carried by the rails to the welding station 16 until the leading edge of the billet engages the stop 30. At this point, the holding mechanism 32 is actuated to pivot the holding arms downwardly on opposite ends of the billet 10, thereby securely holding the billet 10 in a welding position. Prior to, or during this interval, cylinder 48 is actuated to move the welder 18 toward the feeding station 22 until one of the studs 44 is loaded into the collet 41. The welder is then retracted by the cylinder 48 and lowered by cylinder 54 into the path of the billet 10. Cylinder 48 is actuated once again to drive the welder toward the welding station until the ferrule 42 engages the end of the billet 10. At this point, welding current is delivered through the stud 44 and billet 10 which respectively act as electrodes. The ferrule 42 shields the surrounding environment from hot welding material which may be splattered during the weld. Prior to the welding operation, solenoid 24 is actuated to raise stop 26 and thus prevent travel of the next in line billet 10 within the furnace 12.

After completion of the weldment, the welder 18 is retracted horizontally by cylinder 48 and then raised vertically by cylinder 54. After the welder 18 vertically clears the path of the billets 10, solenoid 28 is actuated to lower the stop 30 and arms 34 are pivoted upwardly to release the billet 10 for travel down the line along the rails 14.

From the above, it is apparent that the present invention provides a novel method of preparing metal billets for forging operations, comprising the steps of: heating the billets to forging temperature by passing them in end-to-end relationship through a furnace and then welding a metal stud on each of the heated billets which provides a projection which may be gripped to manipulate the billet during the forging operations.

From the foregoing, it is clear that the process and apparatus of the present invention not only provides for the reliable accomplishment of the objects of the invention, but do so in particularly economical and efficient manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

We claim:
1. A method of preparing metal billets for forging operations or the like, comprising the steps of:
   (a) heating said billets to forging temperature by passing said billets in end-to-end relationship through a furnace; and
   (b) then welding a metal stud on each of said heated billets, said stud providing a projection on the billet which may be gripped to manipulate the billet during said forging operations;

2. The method of claim 1, wherein step (a) is performed by placing said billets in substantially abutting contact with each other on a conveyor.

3. The method of claim 1, including the step of successively conveying each of said billets away from said furnace to a welding station.

4. The method of claim 1, wherein step (b) is performed by holding each of the billets in a fixed position at a welding station and shifting a welder into a welding position contacting the billet at said welding station.

5. The method of claim 4, wherein step (b) is performed by shifting said welder between a field position where studs are fed to said welder and said welding position.

6. Apparatus for welding studs or the like to metal workpieces transported along a path, comprising:

a welding head adapted to be coupled with an electrical power source for delivering electrical current to one of said studs;

first means connected to said welding head for shifting said welding head into and away from said path;

second means for shifting said welding head along said path and into engagement with one of said workpieces;

means on said welding head for releasably holding said one stud; and means for stationarily holding the workpiece while said one stud is being welded to said workpiece;

said stationarily holding means including a pair of spaced apart arms mounted for swinging movement toward and away from said path and swingable into engagement with opposite ends of said workpiece.

* * * * *